United States Patent [19]
Harrold et al.

[11] 3,728,619
[45] Apr. 17, 1973

[54] ACOUSTICAL CORONA LOCATOR HAVING ROTATABLE AND PIVOTABLE TRANSDUCERS

[75] Inventors: Ronald T. Harrold, Murrysville, Pa.; William J. Carter, Muncie, Ind.

[73] Assignee: Westinghouse Electric Corporation, Pittsburgh, Pa.

[22] Filed: June 21, 1971

[21] Appl. No.: 155,096

[52] U.S. Cl.........................324/52, 324/54, 181/.5 R
[51] Int. Cl.........................G01r 31/08, G01r 31/12
[58] Field of Search..........................324/52, 6, 54; 343/10, 118; 340/4, 8 S; 181/.5 T, .5 ED, .5 P, .5 AP, .5 NP, .5 LD

[56] References Cited

UNITED STATES PATENTS

| | | |
|---|---|---|
| 3,612,992 | 10/1971 | Cronin ...................................324/52 |
| 3,281,764 | 10/1966 | Tatom ...............................343/10 X |
| 2,510,687 | 6/1950 | De Vore...........................343/118 X |
| 2,520,693 | 8/1950 | Roberts............................343/118 X |
| 3,622,872 | 11/1971 | Boaz.........................................324/52 |
| 3,286,163 | 11/1966 | Holser et al. ..............................324/6 |

*Primary Examiner*—Gerard R. Strecker
*Attorney*—A. T. Stratton et al.

[57] ABSTRACT

Acoustical corona locating apparatus for use in determining the position of a corona discharge within the casing of a power transformer. Transducer apparatus, which contains at least two transducers, is attached to the wall of the transformer casing at a position where the corona produced ultrasonic wave may be detected. The transducers are rotated and pivoted to determine the direction and distance from the transducers to the corona source.

4 Claims, 5 Drawing Figures

3,728,619

ACOUSTICAL CORONA LOCATOR HAVING ROTATABLE AND PIVOTABLE TRANSDUCERS

BACKGROUND OF THE INVENTION

1. Field of the Invention

This invention relates, in general, to electrical detecting apparatus and, more specifically, to ultrasonic corona detection apparatus for use with power transformers.

2. Description of the Prior Art

Testing high voltage electrical apparatus, such as transformers and reactors, for corona discharges is very desirable as a quality assurance procedure. Corona discharges often go undetected in conventional transformer testing but may, over a period of time, cause complete breakdown of the insulation system. Therefore, it is desirable to provide a corona testing device which will detect corona discharges of relatively small magnitudes.

A useful corona detecting device would not only detect the presence of corona discharges within a transformer, but would also indicate the approximate position of the corona so that the cause of the corona may be analyzed. Several useful methods are presently being used with some degree of success. The most undesirable features of present systems are their inability to determine, in all situations, the position of the corona and the relatively complicated test equipment set-up procedures involved.

Although other types of devices are known, ultrasonic devices have been widely used in transformer corona locating. Since corona discharges provide pressure vibrations in the ultrasonic spectrum, their presence can be detected by a suitable mechanical-to-electrical transducer. The transducer is placed on the outside of the transformer casing and connected to electronic devices which indicate the presence of the corona produced ultrasonic wave. Most of the systems using this principle require more than one transducer placed at different positions about the transformer casing. Alternatively, a single transducer may be moved several times about the casing to determine the point-of-origin of the wave by triangulation techniques. The set-up procedure involved with these prior art systems does not readily permit checking transformers without extensive preliminary equipment set-ups. In addition, some corona discharges are located at positions which make it difficult or impossible to detect the ultrasonic waves at three different positions. Therefore, it is desirable to provide an ultrasonic corona detection system wherein only one transducer location on the transformer casing is required to make the complete measurements necessary to determine the position of the corona discharge.

Since the velocity of the ultrasonic waves through the transformer coolant is usually known, the distance from the wave detecting transducer to the corona can be determined if the time required for the wave to reach the transducer from the corona is known. The time interval for the propagation of the wave is usually determined in prior art systems by an electrical-acoustical method. Electrical devices are used to determine when a corona pulse occurs. Acoustical devices are used to determine when the ultrasonic waves produced by the corona discharge arrive at the test position on the transformer casing. By appropriate calculations, the distance to the corona from the test point can be determined.

The electrical-acoustical method of determining corona distance is not without certain inherent disadvantages. Due to the complexity of the corona pulse wave, it is often difficult to correlate the correct corona pulse with the appropriate acoustical wave pulse. Determination is sometimes difficult even when both waveforms are displayed on an oscilloscope, since the waveforms may be substantially different. Thus, it is desirable to provide an ultrasonic corona detection system which can determine the distance between the corona and the transducer without the use of equipment which attempts to determine the instant of time the corona pulse occurred.

SUMMARY OF THE INVENTION

The invention disclosed herein provides a system for locating the position of a corona discharge occurring within a transformer casing. A transducer device is attached to the transformer casing at a single position. The transducer device contains two transducers which are aligned with each other in a predetermined relationship. The transducer assembly is oriented so that the ultrasonic waves being detected by each transducer have a maximum amplitude and are in phase with each other. This determines the direction of the corona source from the transducer assembly. The distance between the corona source and the transducer assembly is found by pivoting the transducer assembly a predetermined number of degrees, by measuring the phase shift produced by the pivoting, and by calculating the distance to the corona discharge by using the known constants and derived quantities.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENTS

Figure 1:
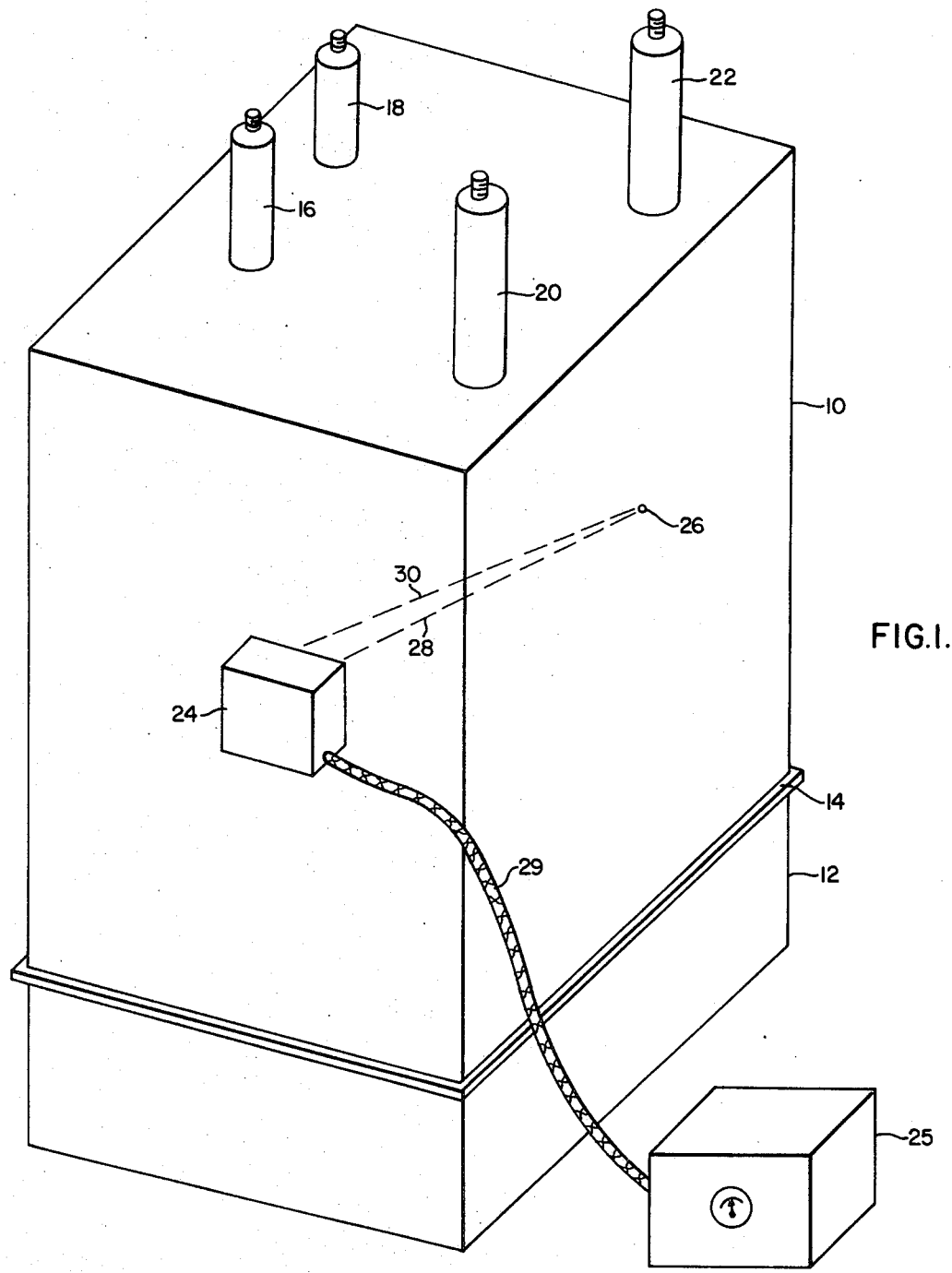
FIG. 1 is an elevational view illustrating a location of the test equipment on a transformer being tested for corona discharges.

Throughout the following description similar reference characters refer to similar members in all Figures of the drawings.

Referring now to the drawings, and FIG. 1 in particular, there is shown an electrical transformer with corona detecting and locating equipment positioned as taught by this invention. The transformer illustrated is of the shell-form type and includes an upper casing portion 10 and a lower casing portion 12, which are connected to each other at the flange area 14. Low voltage bushings 16 and 18 and high voltage bushings 20 and 22 are mounted on the top of the transformer. Although not illustrated, corona measurements are usually made when high voltage electrical leads are connected to one or more of the bushings so that corona discharges will occur at high electrical stress positions.

A transducer housing 24 is attached to the outisde of the transformer casing at a position which will permit detection of the ultrasonic waves produced by the corona source at a point 26. Lines 28 and 30 represent the paths of the ultrasonic waves which are detected by the two transducers contained in the housing 24. The transducers are electrically connected to a detecting means, such as the meter 25, by the cable 28. Details of preferred embodiments of the corona detection equipment and its operation are described more specifically in the hereinafter discussions concerning the other Figures.

Figure 2:
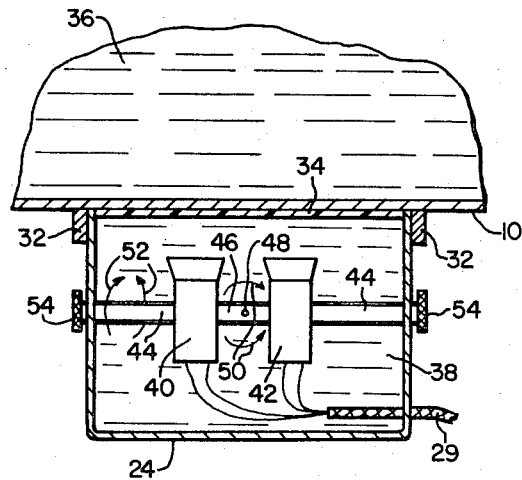
FIG. 2 is a sectional view of a transducer device constructed according to the teachings of this invention.

FIG. 2 is a sectional view of the housing illustrating the placement of the transducers. The housing 24 is attached to the transformer casing 10 by the permanent magnets 32. A gasket 34 of suitable material, such as neoprene, and the casing wall 10, separate the transformer oil 36 from the oil 38 contained within the transducer device. The transducers 40 and 42 are attached to a member which maintains the alignment and separation between the two transducers. The transducers 40 and 42 should be capable of operating effectively at the frequency of the corona produced ultrasonic wave. Typical units which would give satisfactory performance may have a frequency range from 20,000 to 60,000 hertz. The transducer supporting member illustrated in this embodiment of the invention includes the shaft 44 and the transducer bracket 46. The shaft 44 and the bracket 46 are connected together by a pin 48 which permits the transducer assembly to pivot about an axis which is perpendicular to the shaft 44. This rotation is illustrated by the arrows 50. The shaft 44 may be rotated in the direction indicated by the arrows 52 by turning the knobs 54. Ultrasonic waves traveling through the oil 36 enter the oil 38 and cause electrical signals to be generated by the transducers 40 and 42. The electrical signals from the transducers are transmitted to detector means by the cable 28.

By pivoting the transducer assembly about the pin 48, the transducers move in one plane, hereinafter referred to as the horizontal plane or horizontal direction. By rotating the shaft 44, the transducers move in another plane, hereinafter referred to as the vertical plane or vertical direction. Briefly, the corona location is determined by pivoting the transducer assembly so that the ultrasonic waves from the corona source which are received by each transducer are in phase. This condition is achieved only when the corona source is equally distant from both transducers, which is true when the corona source is located midway between the transducers, regardless of the distance from the transducers. This procedure determines the horizontal direction to the corona source from the transducer assembly. The vertical direction to the corona source is determined by rotating the transducer assembly until the maximum electrical signal is produced by the transducers. The vertical lobe of the transducer patterns must be sufficiently directional to produce a larger signal when the corona source is aligned with the axis of the transducer. With the transducer assembly now oriented toward the corona source, the distance thereto is found by pivoting the transducer assembly a known number of degrees in a plane which contains the two transducers and the corona source. From measuring the phase shift in the ultrasonic waves received by the two transducers, the distance to the corona source may be calculated.

Other arrangements may be used for determining the direction to the corona source without departing from the teachings of this invention. The transducer supporting member may be suitably constructed so that the transducers may be pivoted in the vertical direction. Using this embodiment, the vertical direction component to the corona source could be determined by the phase matching procedure, as is used for the horizontal direction component. Instead of modifying the supporting member, using four transducers would suffice. Two would be used in the horizontal plane and two would be used in the vertical plane. Instead of rotating the transducers for maximum signal, an embodiment of this invention may use transducers with a nullpoint in their directional patterns, thus the direction could be determined by rotating the transducers for minimum signal.

Figure 3:
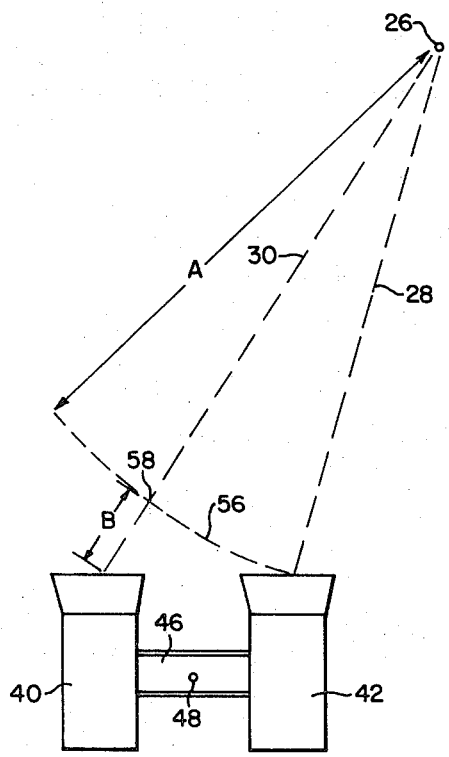
FIG. 3 is a diagram illustrating the propagation of the ultrasonic waves to the transducers.

Since the speed of ultrasonic waves in transformer oil is known to be approximately 18.5 microseconds per inch, if the time of the wave propagation is known, the length of the wave propagation may be calculated. FIG. 3 illustrates the wave paths 28 and 30 from the corona source 26 which exist after the transducer assembly has been pivoted a known number of degrees in the plane containing the two transducers and the corona source. The arc 56, which has a radius A intersects the wave path 30 at the point 58. The distance B is proportional to the distance A and the proportional constant is determined by the number of degrees the transducer assembly is pivoted. By measuring the extra time required for the wave 30 to arrive at the transducer 40 compared to the wave 28 arriving at the transducer 42, and by using the speed of the wave, the distance B can be calculated. Using the known proportional constant, the distance A can be calculated, thus accurately determining the total distance to the corona source 26.

The detection equipment associated with the transducers may comprise various means for suitably processing the electrical pulses received from the transducers. A one-piece portable corona detector could be constructed with the electronic measuring equipment attached to the transducer housing 24. The measuring equipment may consist of a coincident detector which provides an output only when the waves received by each transducer are in phase. Amplifiers and headphones may be used to permit human sensing of a phase difference in the received waves. A remote dual-beam oscilloscope provides an excellent means for measuring the corona produced ultrasonic waves.

Figure 4:
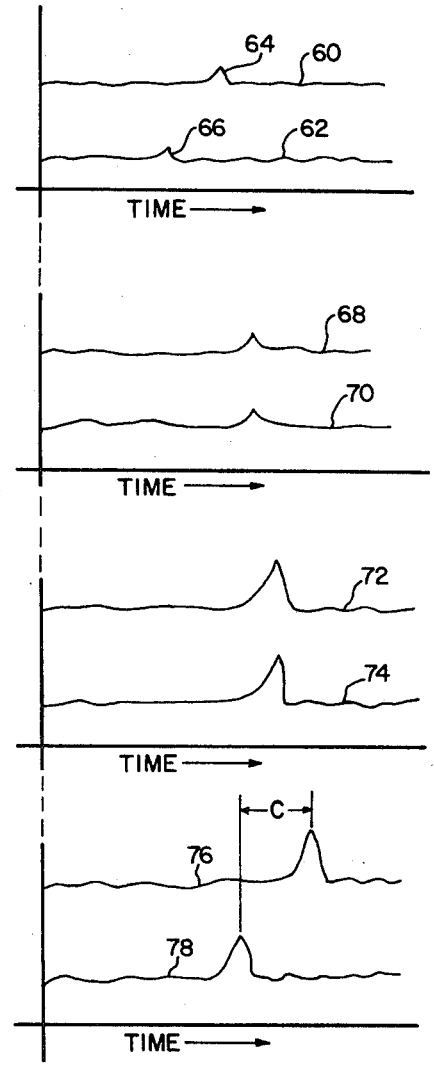
FIG. 4 is a diagram illustrating various waveforms which may be displayed on a dual-beam oscilloscope connected to the transducers.

The waveforms shown in FIG. 4 are typical of those which would be displayed by a dual-beam oscilloscope connected to the transducers through appropriate preamplifiers. The waveforms 60 and 62 represent the electrical signals which may be produced by the transducers 40 and 42 when first applied to the transformer casing. The peaks 64 and 66 are produced by the same corona discharge. When the transducer assembly is pivoted to the correct position, the waveform peaks have the same phase relationship, as shown by the waveforms 68 and 70. When the transducer assembly is rotated to the correct position to find the vertical component of the direction to the corona, the waveform peaks reach a maximum, as shown by the waveforms 72 and 74. When the transducer assembly is pivoted in the plane containing the corona source and the two transducers, the waveform peaks are shifted. This is shown by the waveforms 76 and 78 with the amount of shift indicated by the distance C. Normally, the signal from one transducer would trigger both oscilloscope traces at the same time, therefore, by measuring the distance C and by knowing the horizontal sweep frequency of the oscilloscope, the distance B in FIG. 3 can be calculated. Tables can be used to conveniently correlate between the angular change of the transducer assembly, the phase shift of the waveforms and the distance to the corona source.

Figure 5:
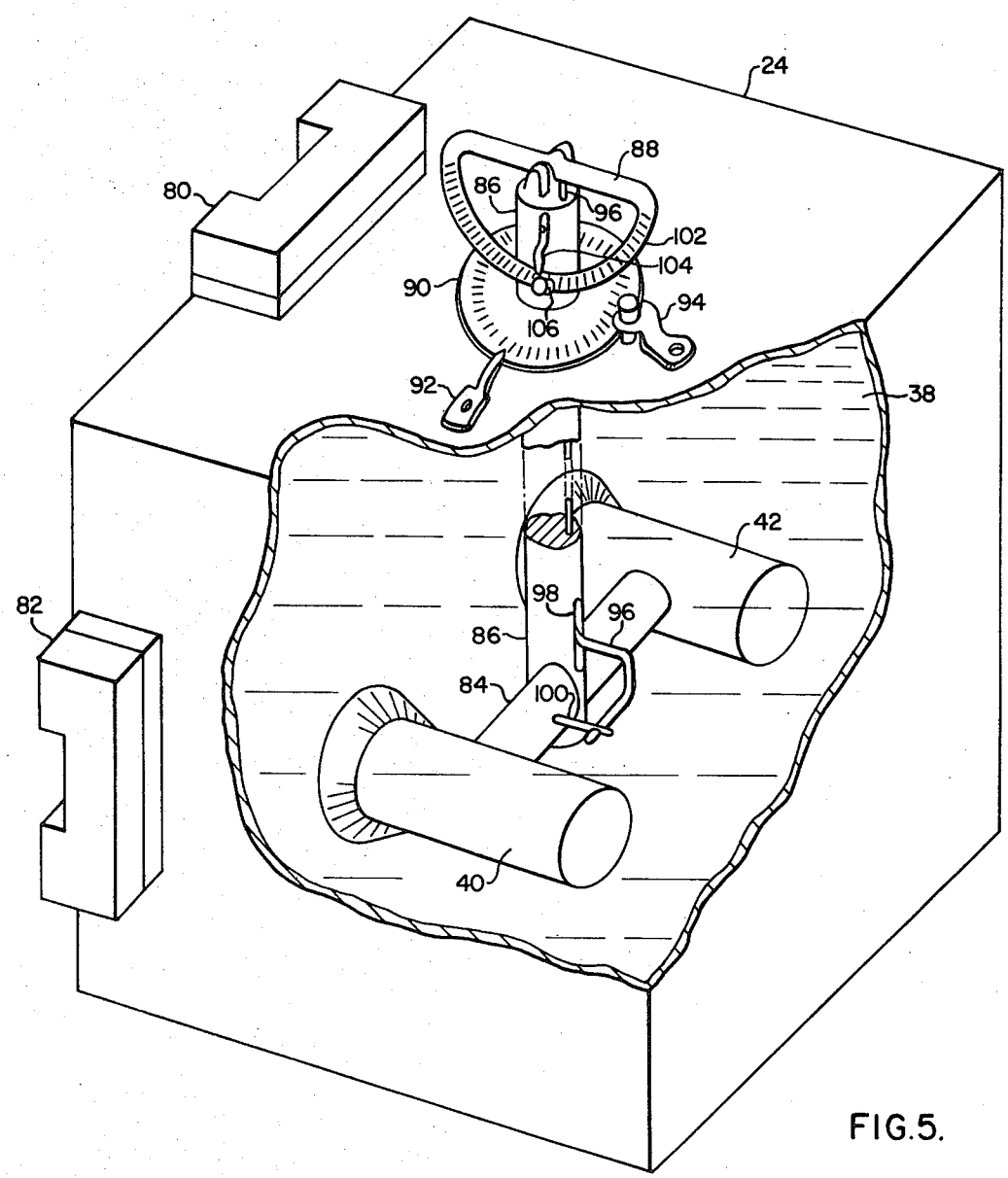
FIG. 5 is a cut-away view of a transducer device constructed according to the teachings of this invention.

There are numerous arrangements which can be used to construct the transducer assembly and its associated supporting structures and housing. FIG. 5 illustrates an arrangement which may be used. The housing 24 includes means for attaching the unit to the transformer casing, such as the permanent magnets 80 and 82. The transducers 40 and 42 are attached to a horizontal shaft 84 which extends through an opening in a vertical shaft 86. The oil 38 may be contained within the transducer housing 24 to acoustically couple the ultrasonic waves penetrating the transformer casing with the transducers.

The shaft 86 extends through an opening in the housing 24 and may be rotated by the handle 88. A calibrated dial plate 90 is attached to the shaft and, with the pointer 92, indicate the position of the transducer assembly. The locking means 94 may be engaged to prevent rotation of the shaft 86.

The handle 88 is pivoted on the shaft 86 and attached to a rod 96. The rod 96 extends through an opening in the shaft 86 and projects from a slot 98 in the shaft 86 near the shaft 84. The rod 96 is bent and attached to a pin 100 which projects from the shaft 84. By rocking the handle 88, the transducers 40 and 42 will be moved in a vertical direction. The handle 88 includes a calibrated dial 102 and the associated pointer 104 and locking means 106.

With the supporting structures described herein, it may be convenient to rotate the transducer housing before performing the pivoting movement in determining the distance to the corona. This makes possible the pivoting of the transducer assembly, in the plane containing the corona source and the two transducers, by rotating the transducers about a single axis. Furthermore, it is within the contemplation of this invention that the transducer supporting structure may be modified to permit pivoting in the plane containing the corona source and the two transducers without rotating the transducer housing and without manual manipulation about both axes of movement. It is also within the contemplation of this invention that the direction to the corona may be determined by the equipment disclosed herein and that the distance may be determined by the electrical-acoustical method by using this equipment and equipment designed to detect the electrical properties of the corona discharge.

Since numerous changes may be made in the abovedescribed apparatus and different embodiments of the invention may be made without departing from the spirit thereof, it is intended that all the matter contained in the foregoing description or shown in the accompanying drawings shall be interpreted as illustrative, and not in a limiting sense.

We claim as our invention:

1. Apparatus for locating corona discharges within a transformer casing, comprising first and second transducers which change ultrasonic waves to electrical signals, said transducers having a directional receiving pattern, supporting means which rigidly maintains the spacing and orientation of said transducers with respect to each other, said supporting means providing means for rotating said transducers around a first axis and for pivoting said transducers around a second axis which is perpendicular to the first axis, said supporting means and said transducers being adapted to be located at a first position relative to said transformer casing for receiving ultrasonic waves which are produced by corona discharges originating at a second position within said transformer casing.

2. The corona locating apparatus of claim 1 wherein the transducers and the supporting means are located on the outside of a transformer casing containing a fluid coolant.

3. The corona apparatus of claim 2 wherein the transducers and the supporting means are located within a housing member, said housing member containing a fluid similar to the fluid coolant contained within the transformer casing, said housing member being adapted for attachment to the outside of the transformer casing.

4. A method of locating corona within a transformer casing comprising the steps of placing ultrasonic transducer apparatus containing first and second transducers at only one position on the outside of the transformer casing, the position of said transducer apparatus being selected to permit said transducers to receive ultrasonic waves produced by a corona discharge within said transformer casing, rotating said transducers around a first axis to determine a plane in which the corona is detected, pivoting said transducers around a second axis to determine the direction to the corona in said plane, and observing the phase shift in the ultrasonic waves which are received by said transducers when they are pivoted.

* * * * *